I. Pardee,
Stump Elevator.
Nº 80,873.  Patented Aug, 11, 1868.
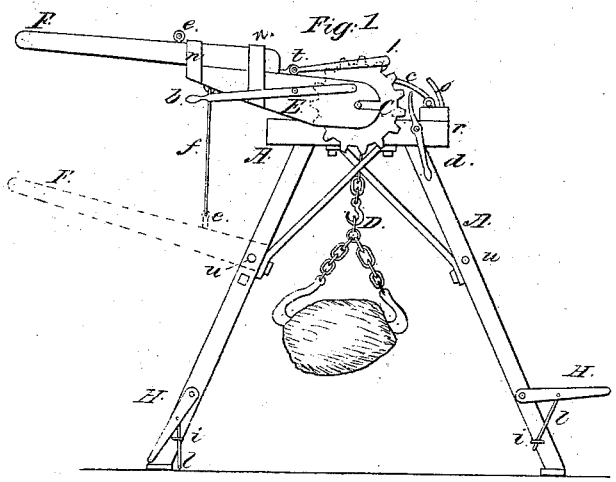
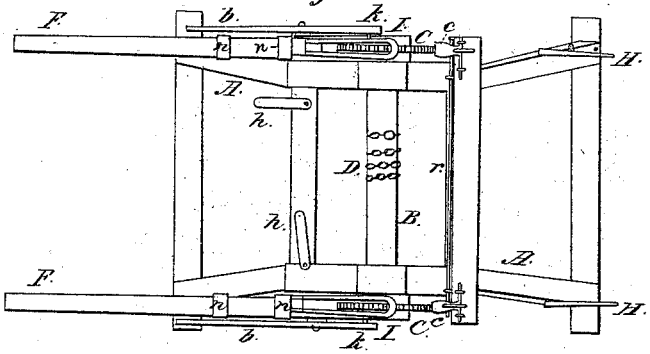
Witnesses:
P. T. Dodge
R. O. Lowrey
Inventor:
Isaac Pardee
by Dodge & Munn
his Attys

United States Patent Office.

ISAAC PARDEE, OF BUENA VISTA, NEW JERSEY, ASSIGNOR TO HIMSELF AND ORSON REED, OF SAME PLACE.

*Letters Patent No. 80,873, dated August 11, 1868.*

---

IMPROVEMENT IN STUMP-MACHINES.

---

*The Schedule referred to in these Letters Patent and making part of the same.*

---

TO ALL WHOM IT MAY CONCERN:

Be it known that I, ISAAC PARDEE, of Buena Vista, in the county of Atlantic, and State of New Jersey, have invented certain new and useful Improvements in Machines for Pulling Stumps, Stones, &c.; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel construction of a machine for pulling up stumps, stones, &c., by hand-power, as hereinafter described.

Figure 1 is a side elevation, and

Figure 2 is a top plan view of my improved machine.

In constructing my machine, I make a frame, A, strongly braced, so as to render it rigid, and across the top place a strong shaft, B, having a ratchet-wheel, C, secured rigidly at each end. Upon the shaft B, at each end, I journal or mount a lever, E, as shown in fig. 1; and to the upper side of this lever, I hinge a pawl, I, at $t$, as represented. A couple of metal straps, $n$, are attached to the lever E, in such a manner as to form a socket to receive the end of another lever, F, this lever F having an eye or staple, $e$, secured to its upper side, into which the lower end of a rod, $f$, may be hooked when the lever F is removed from the straps $n$, and secured to a pin, $u$, projecting from the side of the legs of the frame A, the upper end of said rod $f$ being hinged to the lever E, as represented in red in fig. 1.

Pivoted to the outside of each of the levers E is a small lever, $b$, which has a pin, $k$, projecting from its front inner side, under the pawl I, as represented in figs. 1 and 2, so that by depressing the rear ends of these levers $b$, the pawls I will be raised clear from the wheels C. In front of each of the ratchet-wheels C is pivoted a pawl or catch, $c$, and in front of these is placed a stop, $o$, to prevent their falling over when raised clear from the wheels C. A rod, $m$, extends across the top of the frame A, along one side, as shown in fig. 2, and at each end this rod is provided with a short lever or handle, $d$, as represented in fig. 1, the upper projecting ends of these levers being directly between the pawls $c$ and the wheels C, so that by operating these handles from either side of the machine, the pawls $c$ will be raised clear from the wheels, and thus permit the shaft B to be rotated, so as to unwind the chain D, the pawls I being raised by the levers $b$ at the same time.

To each leg of the frame, near the bottom, a handle, H, is pivoted, as represented in fig. 1, and pivoted to these handles is a rod, $l$, the lower portion of which passes loosely through a staple, $i$, the rod $l$ being provided with a head or stop at its lower end, to prevent it from being drawn out of the staple, and being of such a length as to permit the handles H to be raised to a horizontal position, and held there, as shown on the right-hand side of fig. 1, for carrying the machine when necessary. When not thus required for use, these handles may be turned down out of the way, as represented on the left-hand side of said figure.

The operation is as follows:

The machine being located or placed over the stump or stone to be removed, and the chain D attached to the same by hooking on to a root or otherwise, the levers F are alternately raised and lowered by hand, by which operation the shaft B is rotated, and the chain D is wound up thereon, at the same time pulling up or tipping over the stump to which the chain is attached.

If the stump is a large one, and requires more power to extract it, then the levers F are detached from their sockets on levers E, and are pivoted to the pins $u$, and connected to levers E by the rods $f$, as represented in red in fig. 1. By this arrangement the leverage is much increased, and the machine adapted to heavier work. The hinged pieces $h$ on the top of the frame can be swung around under the levers E, and thus hold them up when not in use.

By this construction, I produce a machine that has great power, and can be operated by hand, and moved as desired, without the use of animal power, other than that of the attendants who operate it.

This machine is admirably adapted to the wants of farmers and others of small means, and operates very successfully.

Having thus described my invention, what I claim is—

1. The machine, consisting of the frame A, having the shaft B, with the wheels C mounted thereon, with the levers E F, stirrups I, and pawls c, constructed and arranged to operate substantially as described.

2. In combination with the levers E and stirrups I, the levers b, arranged as described, for raising the stirrups from the wheels C.

3. The pivoted handles H, provided with the stop-rod l, and arranged to operate as set forth.

4. The hinged bars h, for supporting the levers E, when arranged as shown and described.

ISAAC PARDEE.

Witnesses:
  Lucius Atwood,
  Wm. G. Smith.